Feb. 7, 1939.   W. A. HEINZE ET AL   2,145,928
FLUID SEAL WITH INTEGRAL VULCANIZED PACKING
Filed July 29, 1936    2 Sheets-Sheet 2

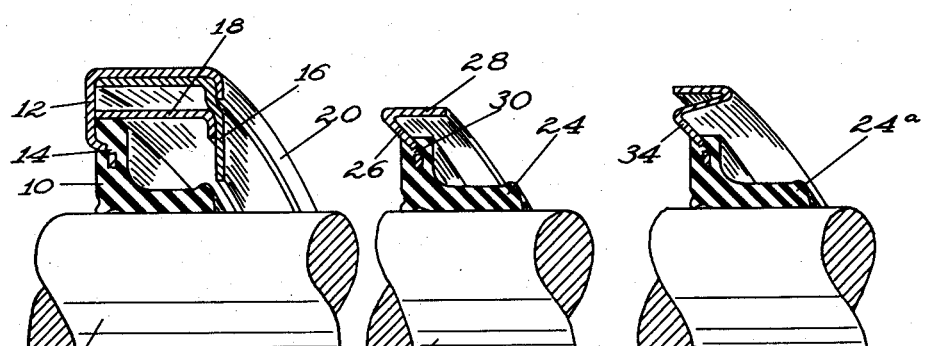
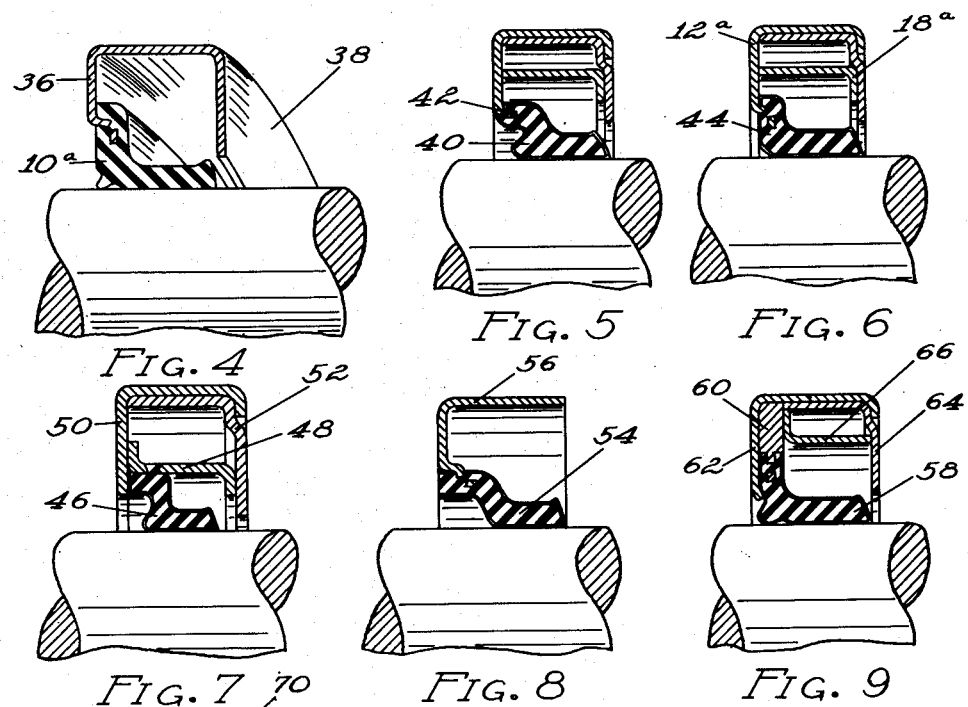

WILLIAM A. HEINZE
WILBURN F. BERNSTEIN
INVENTORS

PER *Albert J. Fihe*

ATTORNEY

Patented Feb. 7, 1939

2,145,928

UNITED STATES PATENT OFFICE 2,145,928

FLUID SEAL WITH INTEGRAL VULCANIZED PACKING

William A. Heinze, Chicago, and Wilburn F. Bernstein, Brookfield, Ill., assignors to Victor Manufacturing & Gasket Company, Chicago, Ill., a corporation of Illinois Application July 29, 1936, Serial No. 93,196

2 Claims. (Cl. 288—1)

This invention relates to an improved fluid seal with an integral vulcanized packing and has, for one of its principal objects, the provision of a sealing element, particularly a grease retainer or oil seal for automobiles or the like, which shall be more simple and yet more efficient in construction than those heretofore used.

One of the important objects of this invention is to provide a fluid seal of the type which includes a flexible diaphragm or sealing element with particular reference to such a sealing element which is composed of an oil- or grease-resistant material and which can be compounded and molded as distinguished from the leather washers, diaphragms or packing elements usually employed.

Another important object of the invention is to provide, in an oil seal or the like, a composite molded diaphragm or packing element which is preferably composed of synthetic rubber or the like and which, during the process of molding, can be actually built onto or vulcanized to a metal shell or other element whereby the entire resulting structure as a unit can be put into a housing and about a rotating shaft such as commonly occurs in automobile manufacture and the like.

Other and further important objects of the invention will be apparent from the disclosures in the accompanying drawings and following specification.

The invention, in a preferred form, is illustrated in the drawings and hereinafter more fully described.

In the drawings:

Figure 1 is a sectional view of one of the improved fluid seals of this invention, showing an integral vulcanized packing applied thereto.

Figure 2 shows a simpler form of the invention.

Figure 3 illustrates a modification of the construction of Figure 2.

Figure 4 shows a shell with a packing vulcanized thereto, which also constitutes a very simple embodiment of the invention.

Figure 5 illustrates a construction somewhat similar to that of Figure 1, only showing a different type of diaphragm.

Figure 6 illustrates a slight modification of the construction of Figure 5.

Figure 7 shows a further development of the invention.

Figure 8 shows a construction somewhat similar to that of Figure 4.

Figure 9 is a representation of another development of the invention, particularly a more rugged type of seal.

Figure 10 is a structure similar to that of Figure 9.

Figure 13A is a sectional view of the packing element of Figure 13.

As shown in the drawings:

Figures 11, 12, 13, 14:
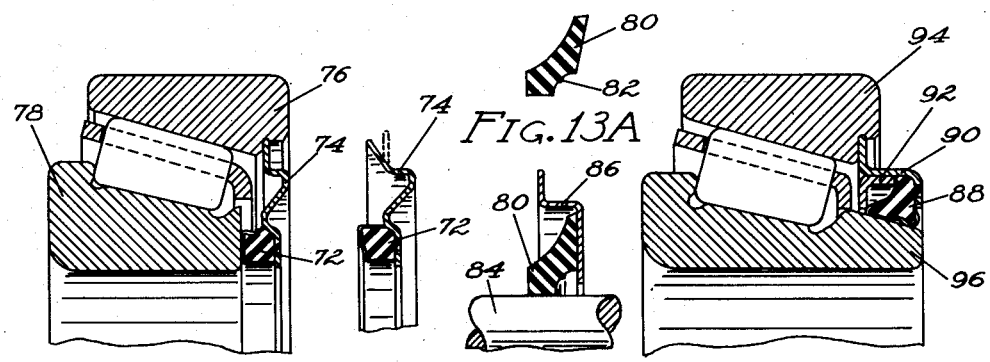
Figure 11 illustrates still another embodiment of the invention, showing the same as applied to a housing and roller bearing.
Figure 12 is a sectional view of the sealing device of Figure 11 before installaiton, the distortion of the shell during installation being illustrated in dotted lines.
Figure 13 shows another development of the invention wherein the packing element is separate and adapted to be fitted directly to the rotating shaft.
Figure 14 is a view somewhat similar to that of Figure 11 but showing a form of the invention wherein the seal is made in a slightly different manner.

The reference numeral 10 indicates generally one of the improved molded or composite diaphragms of this invention, the same being preferably of some synthetic rubber composition capable of molding and vulcanization, and which, during the molding process, can be directly applied and securely fastened to a metal element, in this case the shell 12. It will be noted that the shell 12 has an inturned flange having openings 14 therein through which the material of the vulcanized packing element flows during the process of manufacture and wherein it is accordingly tightly held and maintained, which forms a secure bond between the metal and the synthetic rubber in addition to the bond which naturally exists between the surfaces of the respective materials owing to the vulcanization process.

It will be noted that the shell 12 is somewhat cup-shaped in cross-section and has another cup-shaped element 16 slidably fitted thereinto, there being a reinforcing ring or the like 18 positioned in the inner shell or cup 16, and with one portion thereof tightly fitted against and circumscribing the outer periphery of the packing element 10. One edge 20 of the shell 12 is then spun down about the corresponding portion of the cup-shaped structure or inner shell 16 which is slightly offset as shown in order to receive this inturned edge, thereby forming a compact, solid reinforcing structure which will provide a very efficient seal against a shaft 22. The metal shell 12, with its appurtenances, is, of course, adapted to be press-fitted or the like into a corresponding housing which surrounds the shaft 22 as is usual in these constructions. Attention is directed to the particular cross-sectional shape of the sealing element which may be varied to suit requirements or conditions as will be evident from an inspection of the other showings of similar packings in this application.

In Figure 2, the packing 24 is fastened to an inturned flange 26 of a ring 28 during the process of vulcanization in the mold, the usual openings 30 being provided in the element 26—28 for penetration of the vulcanized material and better adhesive and gripping action between the parts. This particular type of the invention is especially adapted to a condition where there is only a limited space between the housing and shaft 32.

A slightly modified form of the invention is shown in Figure 3 wherein the diaphragm 24a is fastened by vulcanizing to a ring 34 which is somewhat Z-shaped in cross-section, thereby providing for a somewhat greater resiliency in fitting than would be possible with the structure of Figure 2.

In Figure 4 is illustrated a simplified embodiment of the structure of Figure 1 wherein the diaphragm 10a is fastened during the vulcanizing process to a shell 36 somewhat similar to the shell 12 of Figure 1, but which, instead of including the inner shell in the reinforcing ring, merely has a downwardly turned outer flange 38 which forms a substantial but somewhat lighter retainer.

In Figure 5 is shown an embodiment of the invention wherein the diaphragm 40 is of a somewhat different type than the diaphragms of the preceding figures, being of a slightly different cross-section and therefore necessitating an inwardly turned flange 42 of the retaining shell for vulcanizing purposes, the retaining shell in other respects being similar to the shell of Figure 1.

Figure 6 shows an embodiment of the invention wherein the diaphragm 44 is of a still further changed construction, the retaining shell 12a being substantially the same as that of Figure 1. In this figure, the reinforcing ring 18a does not contact the diaphragm 44.

In Figure 7, the diaphragm 46 is preliminarily molded, during the process of vulcanizing, to a reinforcing ring 48, which assembled structure is then inserted as an integral unit into a shell 50 having a cooperating inner shell 52.

In Figure 8, a diaphragm 54 which is more nearly cylindrical than the previous diaphragms is vulcanized during the process of manufacture to an L-shaped shell 56, thereby comprising a rather simple sealing structure.

In Figure 9, the diaphragm 58 is preliminarily molded to a relatively heavy metal ring 60, which elements are then as a unit inserted into a cup-shaped shell 62 having an inner shell 64 and a reinforcing ring 66 associated therewith, the whole being then made into a unitary structure by spinning down the edge of the outer shell 62. It will be noted that the reinforcing ring 66 is L-shaped in cross-section and has one leg thereof fitted against the relatively heavy metal ring 60, thereby affording a very solid and substantial retainer construction.

In Figure 10, the packing element 58a is vulcanized to a ring 68 of somewhat lighter construction than the ring 60, the whole then being inserted into a retaining shell 62a and a corresponding inner 64a with a slightly different type of reinforcing ring as shown at 70.

In Figures 11 and 12, there is illustrated a somewhat different type of sealing element adapted to be used with roller bearing structures and which comprises a diaphragm 72 somewhat rectangular in cross-section molded to a retaining ring 74, the diaphragm being originally molded into the shape shown in Figure 12, and the retaining ring being originally of the shape shown in that figure. In installation, the retaining ring 74 is distorted by driving the same into an annular slot or the like in a portion of the roller bearing housing 76, this distortion being shown by the dotted lines in Figure 12, and the packing element or diaphragm is thereupon closely fitted and compressed against the complementary part 78 of the roller bearing structure, which flattens the angular face of Figure 12 into the shape shown in Figure 11. In this manner, a very effective seal is produced.

In Figures 13 and 13a is shown a modified form of the invention wherein the diaphragm or packing ring 80 is originally molded into the shape shown in Figure 13a having a bead 82, this bead being mainly for the purpose of facilitating removal from the mold, and this packing ring 80 is adapted to be tightly fitted into a shaft 84. A complementary shell element 86 is provided which is fitted into or fastened against a housing or roller bearing structure in any desired or suitable manner, and the dimensions of this shell 86 are such that, when fitted against the diaphragm 80, it will distort the same from the original molded shape of Figure 13a to the shape shown in Figure 13, tnereby affording a very satisfactory seal which is entirely due to the inherent resiliency or internal stress set up in the diaphragm structure itself due to this method of installation.

Figures 15, 16, 17:
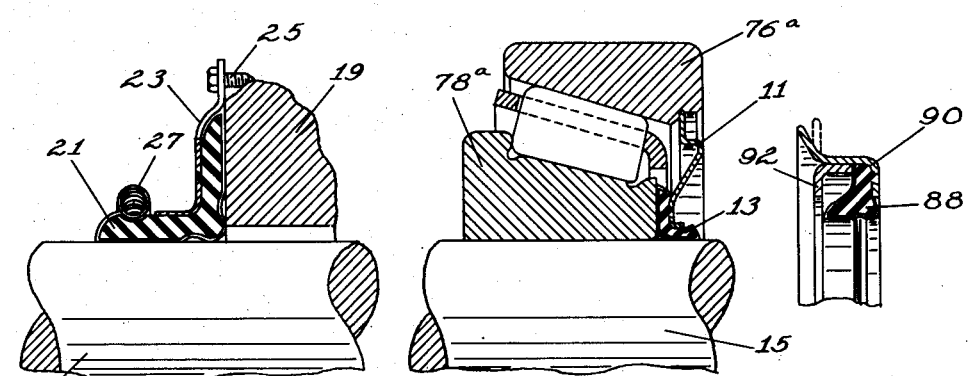
Figure 15 is a showing of the seal of Figure 14 before installation.
Figure 16 is a combination and adaptation of the seal of Figure 11.
Figure 17 is an embodiment of the invention wherein the seal is positioned outside the housing.

In Figures 14 and 15 is illustrated another type of oil seal adapted to be used with a different form of roller bearing, the same comprising a diaphragm or packing element 88 molded to a retaining ring or shell 90 which is likewise adapted to be distorted from the shape shown in Figure 15 to that illustrated in Figure 14 during the process of installation. This shell has fitted thereinto a reinforcing ring 92 which may be spot-welded or otherwise fastened into place, this also serving to act as an additional molding element for the diaphragm itself. The shell is mounted in a portion 94 of a roller bearing, and the diaphragm is fitted against the sloping face of the complementary part 96 of the bearing wherein the diaphragm is, during the process of installation, distorted from the shape shown in Figure 15 to that of Figure 14, again providing a very satisfactory and efficient seal.

In Figure 16 is illustrated a further embodiment of the invention wherein a shell 11, somewhat similar to the shell 74 of Figures 11 and 12, is mounted in the corresponding portion 76a of a roller bearing, the diaphragm 13 being L-shaped in cross-section and vulcanized to the shell 11, and having one face adapted to be fitted in sealing relationship against the complementary portion 78a of the roller bearing and with another face adapted to be fitted in sealing relationship against a shaft 15, thereby forming a double seal with two surfaces at right angles to each other.

In Figure 17 is illustrated an embodiment of the invention wherein there is not sufficient space for the insertion of a seal between the shaft 17 and the housing 19, and wherein the sealing element 21 is shaped so as to present two sealing faces, one against the shaft and the other against the outer face of the housing, the same being fastened during the process of vulcanizing to a retaining shell 23 which is thereupon fastened by bolts or the like 25 to the housing 19. A garter spring or the like 27 may be fitted into the diaphragm beyond the retaining shell 23 for additional constricting and therefore better sealing action.

Figures 18, 19, 20:
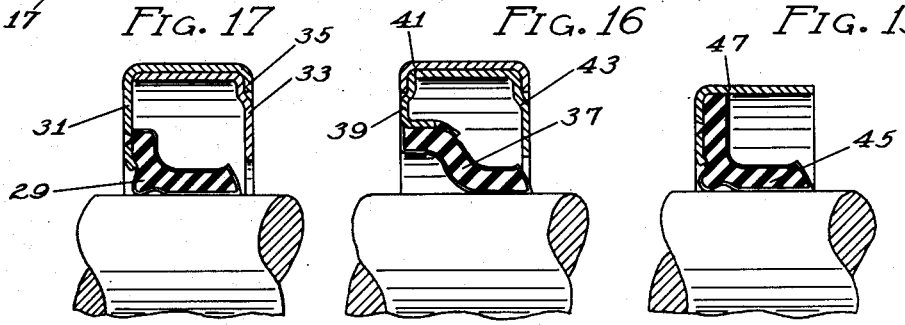
Figure 18 shows another rather simple type of sealing unit somewhat similar to that of Figure 4.
Figure 19 illustrates a further modification of the invention.
Figure 20 shows a development thereof, again somewhat similar to that shown in Figures 4 and 8.

In Figure 18, a diaphragm or packing element 29 somewhat L-shaped in cross-section is vulcanized to the bottom of a cup or shell structure 31, the same having fitted thereinto a reinforcing shell 33 which is then fastened in position by the inturned edge 35.

Figure 19 presents a somewhat similar structure wherein a diaphragm 37 somewhat S-shaped in cross-section is preliminarily vulcanized to a retaining ring 39, the whole being then fitted into a peripheral shell 41 having a cup-shaped complementary shell or ring 43 mounted therein in the usual manner.

Figure 20 presents a further modified form of the invention wherein the diaphragm 45 is L-shaped in cross-section with one leg of the L contacting and vulcanized to a corresponding face of a cup-shaped shell 47, thereby presenting a structure somewhat similar to that shown in Figure 8, but with the diaphragm in actual vulcanized contact with one entire face of the shell.

Figure 21:
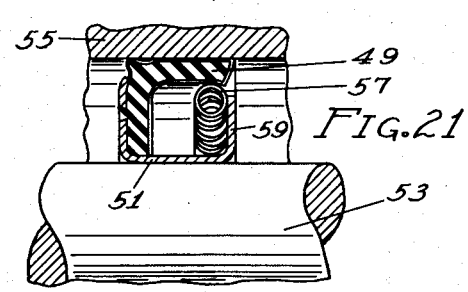
Figure 21 illustrates a type of the invention wherein the metal shell is applied to the shaft, and the packing element operates against the housing.

A reversed and slightly modified type of structure of Figure 20 is illustrated in Figure 21 wherein an L-shaped diaphragm or packing element 49 is vulcanized to a metal shell or the like 51, the shell, in turn, being adapted to be slidably or press fitted into a shaft 53, and the diaphragm having its outer face adapted to contact a housing 55 in sealing relationship therewith. A spring element 57 is inserted under compression in the shell 51 which is then turned up at 59 to retain the spring in position and against the inner face of the diaphragm 49 so as to tend to extend the same outwardly against the housing 55, thereby permitting a better sealing action.

It will be evident that herein is presented a type of oil seal or grease retainer which is particularly adapted for automotive constructions and which, on account of the accuracy of manufacture possible with vulcanized molded packing elements or diaphragms, can be made peculiarly efficient, and which, furthermore, on account of the possibilities due to the vulcanization process, can be made of a relatively small number of parts in practically integral units whenever desired, thereby producing an economical but highly efficient sealing means, and which can be modified and developed to meet practically all conditions which might present themselves in this complicated automotive field.

We are aware that many changes may be made and numerous details of construction varied throughout a wide range without departing from the principles of this invention, and we, therefore, do not purpose limiting the patent granted hereon otherwise than as necessitated by the prior art.

We claim as our invention:

1. A fluid seal, comprising a retaining metal shell and a synthetic rubber packing element vulcanized thereto, a fabric coating over the packing element, the shell being U-shaped in cross-section, and reinforcing means in the shell, said reinforcing means comprising a complementary shell slidably fitted into the first shell, and a reinforcing ring in the complementary shell, the U-shaped outer shell having an inturned edge to which a corresponding portion of the diaphragm is vulcanized.

2. A fluid seal, comprising a retaining metal shell and a synthetic rubber packing element vulcanized thereto, a fabric covering vulcanized to the packing element, the shell being U-shaped in cross-section, and reinforcing means in the shell, said reinforcing means comprising a complementary shell slidably fitted into the first shell, and a reinforcing ring in the complementary shell, the U-shaped outer shell having one edge turned inwardly and thence downwardly to which a corresponding portion of the diaphragm is vulcanized.

WILLIAM A. HEINZE.
WILBURN F. BERNSTEIN.